US008867404B2

(12) United States Patent
Hung et al.

(10) Patent No.: US 8,867,404 B2
(45) Date of Patent: Oct. 21, 2014

(54) NODE LEVEL VECTORING SYNCHRONIZATION

(75) Inventors: Chin Ngek Hung, San Jose, CA (US); Jie Liu, Shenzhen (CN); Xiang Wang, Shenzhen (CN); Jinxiong Lu, Shenzhen (CN); Jianping Tu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 269 days.

(21) Appl. No.: 13/365,469

(22) Filed: Feb. 3, 2012

(65) Prior Publication Data

US 2013/0202002 A1 Aug. 8, 2013

(51) Int. Cl.
*H04L 12/28* (2006.01)
*H04L 12/50* (2006.01)

(52) U.S. Cl.
USPC .......................................... 370/254; 370/360

(58) Field of Classification Search
None
See application file for complete search history.

(56) References Cited

U.S. PATENT DOCUMENTS

| | | | | |
|---|---|---|---|---|
| 2002/0196801 A1* | 12/2002 | Haran et al. | .................. | 370/432 |
| 2005/0201554 A1* | 9/2005 | Kramer et al. | .................. | 380/28 |
| 2009/0141822 A1* | 6/2009 | Fang et al. | .................. | 375/260 |
| 2010/0098433 A1* | 4/2010 | Boyd et al. | ..................... | 398/155 |
| 2010/0208843 A1* | 8/2010 | Treyer | ............................ | 375/299 |
| 2011/0122920 A1* | 5/2011 | Filipiak et al. | ................ | 375/130 |
| 2011/0142447 A1* | 6/2011 | Boyd et al. | ...................... | 398/58 |
| 2011/0286503 A1* | 11/2011 | Cioffi et al. | .................. | 375/220 |
| 2012/0008953 A1* | 1/2012 | Lu et al. | .......................... | 398/66 |
| 2012/0020668 A1* | 1/2012 | Trojer et al. | .................. | 398/115 |
| 2012/0045199 A1* | 2/2012 | Sun et al. | .......................... | 398/5 |
| 2012/0082188 A2* | 4/2012 | Nicholls et al. | ............... | 375/145 |
| 2012/0304241 A1* | 11/2012 | Boyd et al. | ..................... | 725/129 |
| 2013/0045010 A1* | 2/2013 | Mukai | ............................. | 398/52 |

FOREIGN PATENT DOCUMENTS

| | | |
|---|---|---|
| CN | 101233781 A | 7/2008 |
| EP | 1748671 A1 | 1/2007 |
| EP | 1936825 A1 | 6/2008 |
| EP | 2023500 A1 | 2/2009 |
| JP | 2010141759 A | 6/2010 |
| WO | 2006121378 A1 | 11/2006 |

OTHER PUBLICATIONS

Foreign Communication From a Counterpart Application, PCT Application No. PCT/CN2013/071322, International Search Report dated May 9, 2013, 6 pages.
Foreign Communication From a Counterpart Application, PCT Application No. PCT/CN2013/071322, Written Opinion dated May 9, 2013, 5 pages.
"Series G: Transmission Systems and Media, Digital Systems and Networks—Digital Sections and Digital Line System—Access Networks—Self-FEXT Cancellation (Vectoring) for Use With VDSL2 Transceivers," ITU-T Recommendation G.993.5, Apr. 2010, 80 pages.

* cited by examiner

*Primary Examiner* — Eunsook Choi
(74) *Attorney, Agent, or Firm* — Conley Rose, P.C.; Grant Rodolph; Nicholas K. Beaulieu (57) ABSTRACT

An apparatus for synchronizing a plurality of digital subscriber line access multiplexers (DSLAMs) comprising a reference clock configured to generate a reference clock signal, and an interface configured to transmit the reference clock signal to the DSLAMs, wherein each of the DSLAMs is configured to align its system clock with the reference clock.

18 Claims, 8 Drawing Sheets

NODE LEVEL VECTORING SYNCHRONIZATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Crosstalk may be a significant source of noise in wireline communication systems, especially those based on Digital Subscriber Line (DSL) technology. In International Telecommunication Union (ITU) standard G.993.5-2010 (i.e., G.vector), crosstalk may be mitigated by aligning or synchronizing transmissions from a given DSL access multiplexer (DSLAM) (i.e., intra-DSLAM crosstalk). However, crosstalk among different DSLAMs (i.e., inter-DSLAM crosstalk) may not be addressed by the G.vector standard. Therefore, inter-DSLAM crosstalk may be a significant source of noise in wireline systems, especially those based on the G.vector standard.

SUMMARY

In a first aspect, the invention includes an apparatus for synchronizing a plurality of DSLAMs comprising a reference clock configured to generate a reference clock signal, and an interface configured to transmit the reference clock signal to the DSLAMs, wherein each of the DSLAMs is configured to lock its system clock with the reference clock.

In another aspect, the invention includes a method for synchronizing a plurality of DSLAMs comprising generating a reference clock signal, and transmitting the reference clock signal to the DSLAMs, wherein each of the DSLAMs is configured to align its system clock with the reference clock.

In yet another aspect, the invention includes a DSLAM comprising an interface that is configured to receive a trigger clock pulse from a node vector control entity (NVCE), at least one memory; and a processor configured to receive the trigger clock pulse, upon receiving the trigger clock pulse, save values of a tick counter, a symbol counter, and a Sync symbol counter to the at least one memory, transmit the values of the tick counter, the symbol counter, and the Sync symbol counter to the NVCE, receive a value of a first offset and a second offset, wherein the first offset is based on an offset between the tick counter and an NVCE tick counter, and wherein the second offset is based on the symbol counter, the Sync symbol counter, a NVCE symbol counter, and a NVCE Sync symbol counter, adjust the symbol boundary, the symbol counter, and the Sync symbol counter based on the first offset and the second offset.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Each of a plurality of DSLAMs may comprise a system vector control entity (SVCE) module, which may perform centralized control for its corresponding DSLAM, and may further comprise multi line-cards. Each line-card may contain multiple lines. A SVCE module may control an initialization of state flows, a cancellation vector engine, and synchronization of DSL lines among line-cards within a DSLAM. A DSLAM may be in synchronous mode, in which case DSL lines may synchronize by locking the sampling clocks, aligning symbol boundaries, and aligning the position of Sync symbols. If a cable binder is shared by multiple DSLAMs, it may be desirable for DSLAMs to be synchronized to have effective crosstalk cancellation.

Intra-DSLAM crosstalk has previously been addressed, but inter-DSLAM crosstalk has not. For example, European Patent Application Publication 1936825, entitled "A transient crosstalk controlling device," by J. Sylvia Verlinden, relates to mitigating transient crosstalk between DSL loops extending from a node or a single line termination board (linecard) in an access node. Transient crosstalk may be noise induced by a subscriber line into other subscriber lines before it can be cancelled by a crosstalk cancellation mechanism. As another example, European Patent Application Publication 2023500, entitled "A device and associated method for measuring crosstalk," by M. Guenach, et al., relates to a device comprising for transmitting a signal on the inactive subscriber line and synchronously measuring crosstalk induced into the active subscriber lines by transmitting the signal on the inactive subscriber line. Synchronization among DSLAMs has not been addressed previously.

Systems and methods are presented herein that relate generally to synchronization among DSLAMs that may assist with mitigating transient crosstalk between DSL loops that may be shared in a same cable binder. Synchronization may be performed by locking a sampling clock, aligning a symbol boundary, and aligning synchronization symbols.

Figure 1:
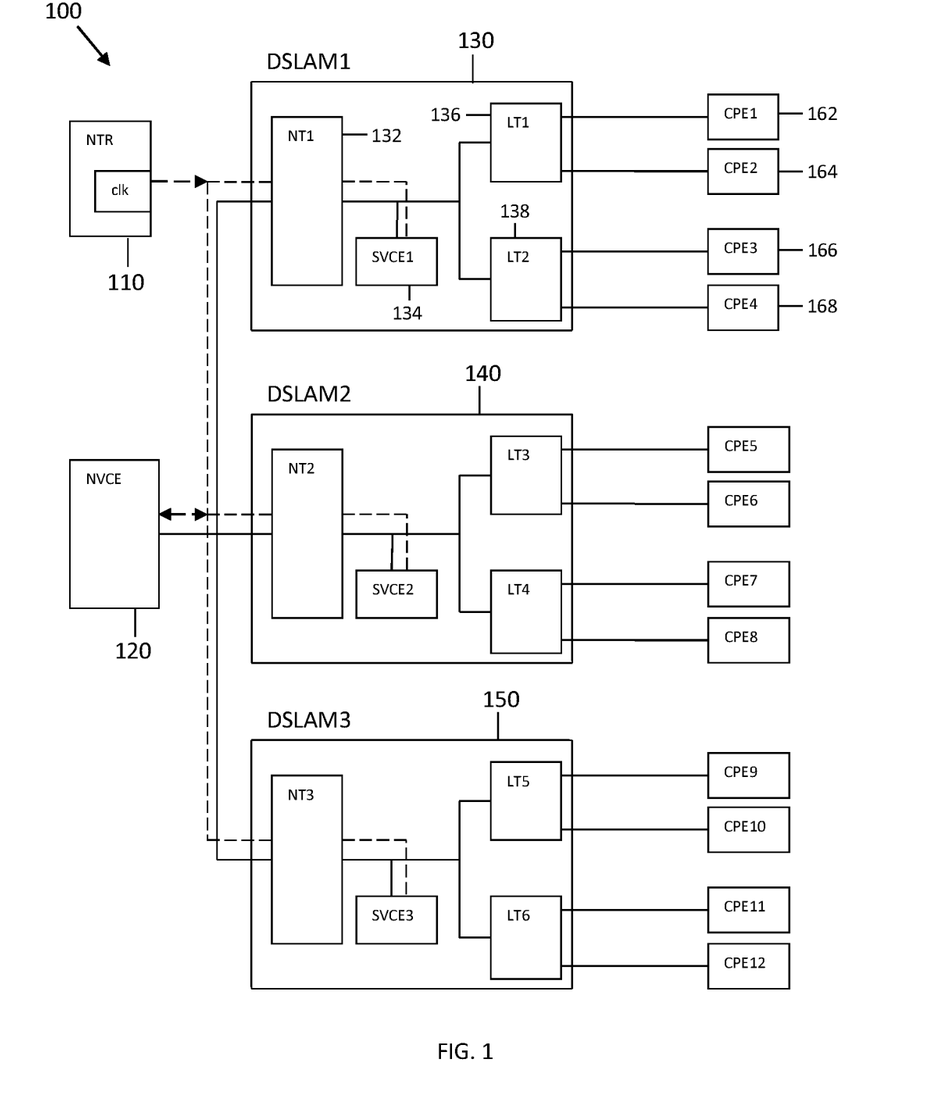
FIG. 1 is an embodiment of a system for synchronizing DSLAMs.

FIG. 1 is an embodiment of a system 100 for synchronizing DSLAMs. The system 100 comprises a network reference clock (NTR) 110, a node vector control entity (NVCE) 120, and DSLAMs 130, 140, and 150 configured as shown in FIG. 1. Each of the DSLAMs 130, 140, and 150 may be coupled to one or more customer-premises equipments (CPEs), exemplary ones of which are labeled as 162, 164, 166, and 168. An example CPE may be a DSL modem. Each DSLAM may comprise a network terminal (NT), a SVCE, and one or more line terminals (LTs), exemplary ones of which are labeled as 132, 134, 136, and 138, respectively, and configured as shown in FIG. 1. Three DSLAMs 130, 140, and 150 are shown in FIG. 1 for illustrative purposes, but the system 100 may comprise any number of DSLAMs. A CPE, such as CPEs 162, 164, 166, and 168, may be located in a customer's premises, such as a home or business, whereas a DSLAM, such as DSLAMs 130, 140, and 150, may be located in an operator's premises, such as a telephone exchange or a central office. A connection between a CPE and a DSLAM may be an electrical conductor, such as a twisted-pair copper line, as an example.

A NT (e.g., NT 132) may provide an interface between a DSLAM and other network equipment on the operator side of a network. A SVCE (e.g., SVCE 134) may provide centralized control for a DSLAM (e.g., 130) so that all CPE lines connected to the DSLAM may be synchronized. However, an SVCE may not provide synchronization between DSLAMs.

The NTR 110 may provide a clock signal that may be used by all DSLAMs 130, 140, and 150. The NVCE 120 may generate a common reference clock and input to all the DSLAMs 130, 140, and 150. The common reference clock may be synchronized with the NTR 110 clock. Each DSLAM 130, 140, 150 may lock its system clock and sampling clock with the common reference clock. In order to synchronize a sampling clock of all CPE lines, each DSLAM may have an input pin accepting either NTR clock or a common reference clock from the NVCE 120. Information between DSLAMs and CPEs may be exchanged via multitone modulation schemes, such as discrete multitone (DMT) modulation or orthogonal frequency division multiplex (OFDM) modulation. For convenience, the discussion focuses on DMT modulation, but the systems and methods described herein also apply to OFDM modulation.

Figure 2:
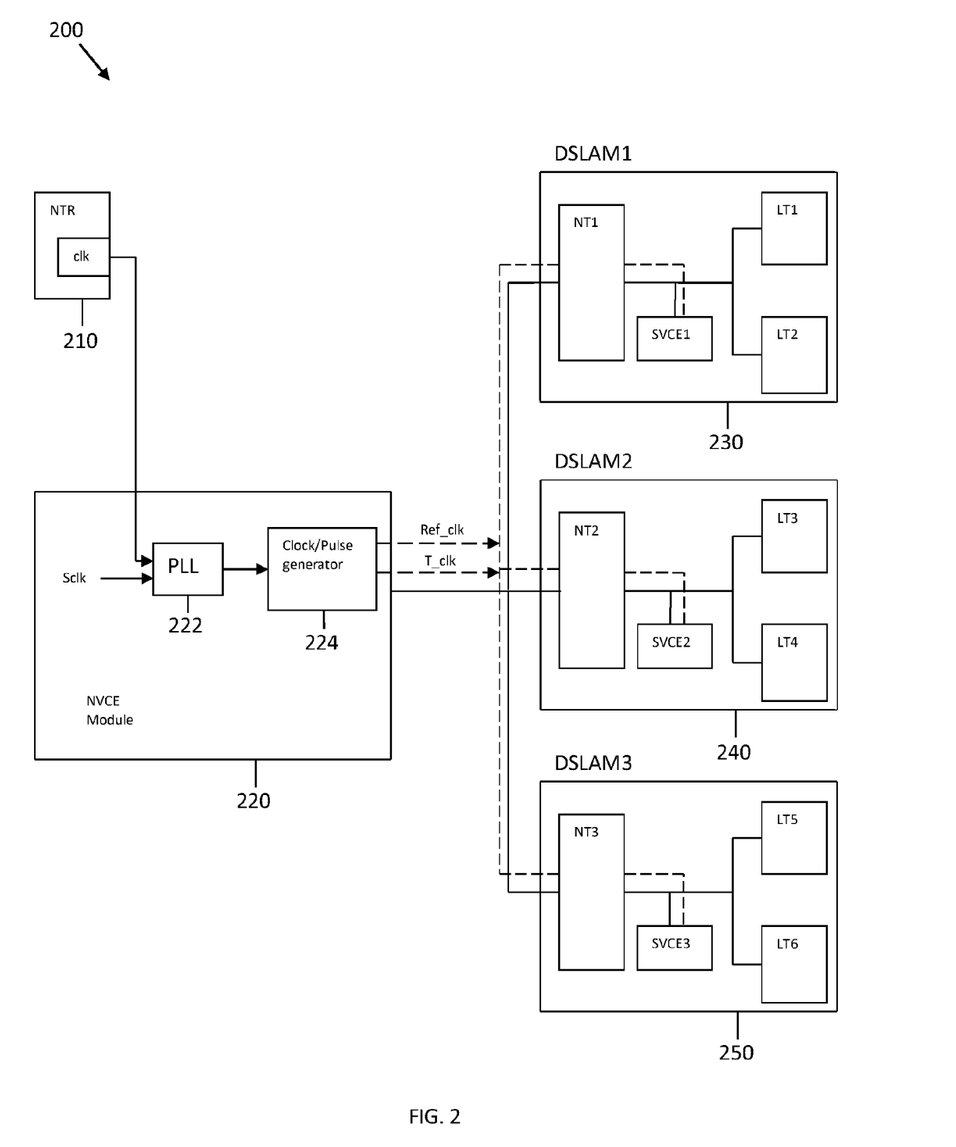
FIG. 2 is another embodiment of a system for synchronizing DSLAMs.

FIG. 2 is another embodiment of a system 200 for synchronizing DSLAMs. The system 200 comprises a NTR 210, a NVCE 220, and DSLAMs 230, 240, and 250 configured as shown in FIG. 2. The NVCE 220 comprises a phase lock loop (PLL) 222 and a clock/pulse generator module 224 configured as shown in FIG. 2.

A local clock (not shown) in NVCE 220, which generates local clock signal (Sclk), may be synchronized with the NTR clock via the PLL 222. An output of the PLL 222 may be fed into the clock/pulse generator module 224. The clock/pulse generator module 224, which may also be referred to as a reference clock, may output two signals, common reference clock signal (Ref_clk) and trigger clock signal (T_clk). Other clocks in clock/pulse generator module 224 may be synchronous 4 kilohertz (kHz) and 70.656 megahertz (MHz) clocks. The reference clock signal Ref_clk may be connected to all the DSLAMs. The reference clock signal Ref_clk may be transmitted to all the DSLAMs through standard network interface hardware in the NVCE 220.

Each DSLAM may comprise a PLL. In each DSLAM, a local system clock may be locked with Ref_clk through the DSLAM's PLL. Each DSLAM may also generate synchronous 4 KHz and 70.656 MHz clocks. A DMT symbol may be generated in a DSLAM based on its 4 KHz clock. The 4 KHz clocks in NVCE 220 and a DSLAM may not be aligned. Each DMT symbol may have a duration of ¼ KHz=250 microseconds (usec). A tick counter may use a 70.656 MHz clock, as an example, but the tick counter may be much faster than 70.656 MHz to get a better resolution. A clock ratio may be 70.656 MHz/4 KHz=17664 ticks per DMT symbol, which may equate to 250 usec/17664=14.153 nanoseconds (nsec)/tick. DMT symbols may be numbered from symbol 0 to symbol 256, with DMT symbol 256 designated as a Sync symbol, also known as a synchronization symbol (i.e., every $257^{th}$ DMT symbol may be a Sync symbol). In general, DMT symbols may be numbered from symbol 0 to symbol M, where M is a positive integer, with symbol M designated as a Sync symbol.

The NVCE 220 may comprise several counters—a NVCE symbol counter (SCnt), a NVCE Sync symbol counter (SSCnt), and a NVCE tick counter (TCnt). An NVCE symbol counter (SCnt) repeatedly counts from DMT symbol 0 to symbol 256. The NVCE symbol counter may be implemented in hardware or software and may be based on a 4 KHz clock in the NVCE 220. The Sync symbol counter may be incremented by one for every 257 DMT symbols. The Sync symbol counter may be modulo of 1024. The Sync symbol counter may be implemented in hardware or software. The NVCE tick counter repeatedly counts from a first DMT symbol (i.e., symbol counter=0) sample to a last DMT symbol (i.e., symbol counter=256) sample. The tick counter may be implemented in hardware. The tick counter may be modulo by 257*17664=4539648 ticks.

A pilot sequence length may be $2^n$, where n is an integer value. A minimum pilot sequence length may be greater than a number of subscriber lines, and the maximum pilot sequence length may be 512. The pilot sequence may be an orthogonal sequence, such as a Hadamard binary sequence. Each DSL subscriber line may use a different pilot sequence or may use the same pilot sequence. Pilot sequences may be applied to Sync symbols such that the pilot sequence counter has reached the length of the pilot sequence and the process repeats. That is, the pilot sequence counter=mod [Sync symbol counter, pilot sequence length], where "mod" denotes the modulo operator. By synchronizing the Sync symbol counters in a DSLAM with the NVCE Sync symbol counter, the pilot sequence may be synchronized.

Figure 3:
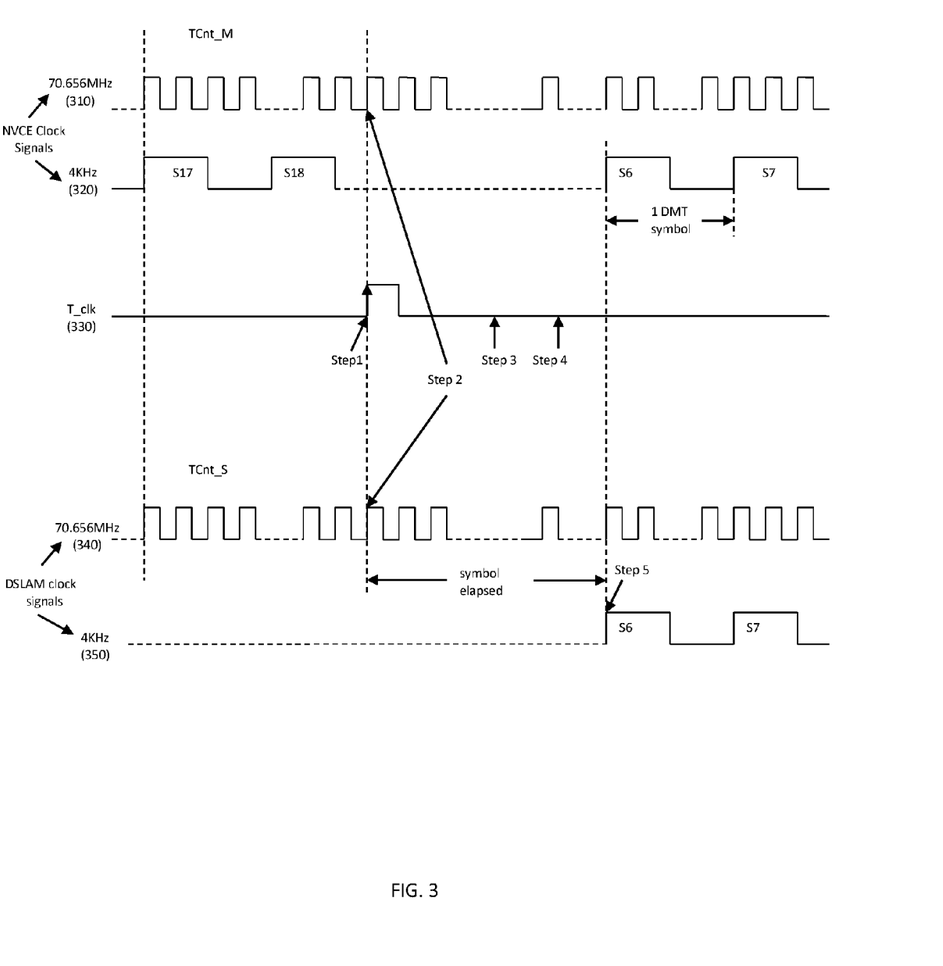
FIG. 3 illustrates clock signals for a NVCE and a DSLAM.

Synchronization between DSLAMs 230, 240, and 250 may occur as follows. For illustrative purposes, synchronization of one DSLAM (e.g., DSLAM 230, 240, or 250) with NVCE (e.g., NVCE 220) clocks is discussed, but synchronization of each DSLAM with NVCE 220 clocks may be similar. Synchronization is explained with the assistance of FIG. 3, which illustrates clock signals for a NVCE and a DSLAM. In particular, FIG. 3 illustrates a NVCE tick counter clock signal 310, a NVCE symbol clock signal 320, a trigger clock signal 330, a DSLAM tick counter clock signal 340, and a DSLAM symbol clock signal 350. A NVCE and a DSLAM may be considered to be in a master-slave relationship.

NVCE may send a pulse via trigger clock 330 (labeled as step 1). On the raising edge of T_clk NVCE may save values of tick counter (TCnt_M), symbol counter (SCnt_M), and Sync symbol counter (SSCnt_M) into one or more memories (labeled as step 2). A DSLAM may detect a rising edge of T_clk, and a DSLAM may have an input pin for accepting trigger clock signal T_clk from a NVCE. Upon the rising edge of T_clk, a DSLAM may save its value of tick counter (TCnt_S), symbol counter (SCnt_S), and Sync symbol counter (SSCnt_S) into one or more memories. (Each DSLAM may have its own tick counter, symbol counter, and Sync symbol counter.) Next NVCE may obtain values TCnt_S, SCnt_S, and SSCnt_S from the DSLAM (labeled as step 3). NVCE may obtain these values by receiving them from the DSLAM or by reading the values from one or more memories in the DSLAMs, NVCE then computes an offset between tick counters as Offset_tick_ref=TCnt_M−TCnt_S and an offset in DMT symbols as Offset_symbol_ref= (SCnt_M+257*SSCnt_M)−(SCnt_S+257*SSCnt_S). Next NVCE sends values Offset_tick_ref and Offset_symbol_ref to the DSLAM (labeled as step 4). Finally, the corresponding DSLAM computes sample_offset=mod [Offset_tick_ref, 17664], SCnt_new=mod [SCnt_S+symbol_elapsed+Offset_symbol_ref, 257], and SSCnt_new=mod [SCnt_S+symbol_elapsed+Offset_symbol_ref, 257*1024] and adjusts its symbol boundary by sample_offset ticks, its symbol counter to SCnt_new, and its sync symbol counter to SSCnt_new (labeled as step 5), where duration "symbol elapsed" in FIG. 3 may be a duration in DMT symbols between a rising edge of T_clk and a time when the DSLAM adjusts its counters.

After following the procedure described above, the 4 kHz clocks of NVCE and DSLAM may be synchronized. If multiple DLSAMs follow this procedure, the DSLAMs may be synchronized. Synchronization of the 4 kHz clocks may be finalized by delaying/advancing the 4 kHz clock by sample_offset ticks in the DSLAM. Another way to align the symbol boundary without modifying the DSLAM 4 kHz clock may be either delaying or advancing the transmit/receive hardware buffer pointers. The DSLAM may adjust a hardware buffer pointer by a number of samples, Num_sample=round [T_sampling/(sample_offset*14.153 nsec)], where T_sampling is a DSLAM sampling clock. Another embodiment to align the symbol boundaries may be for a DSLAM to lock its 4 kHz clock with a NVCE 4 kHz clock by using a PLL in the DSLAM to phase lock the clocks. If the DSLAM 4 kHz clock is phase locked, a symbol boundary may be aligned at 4 KHz boundary.

Figure 4:
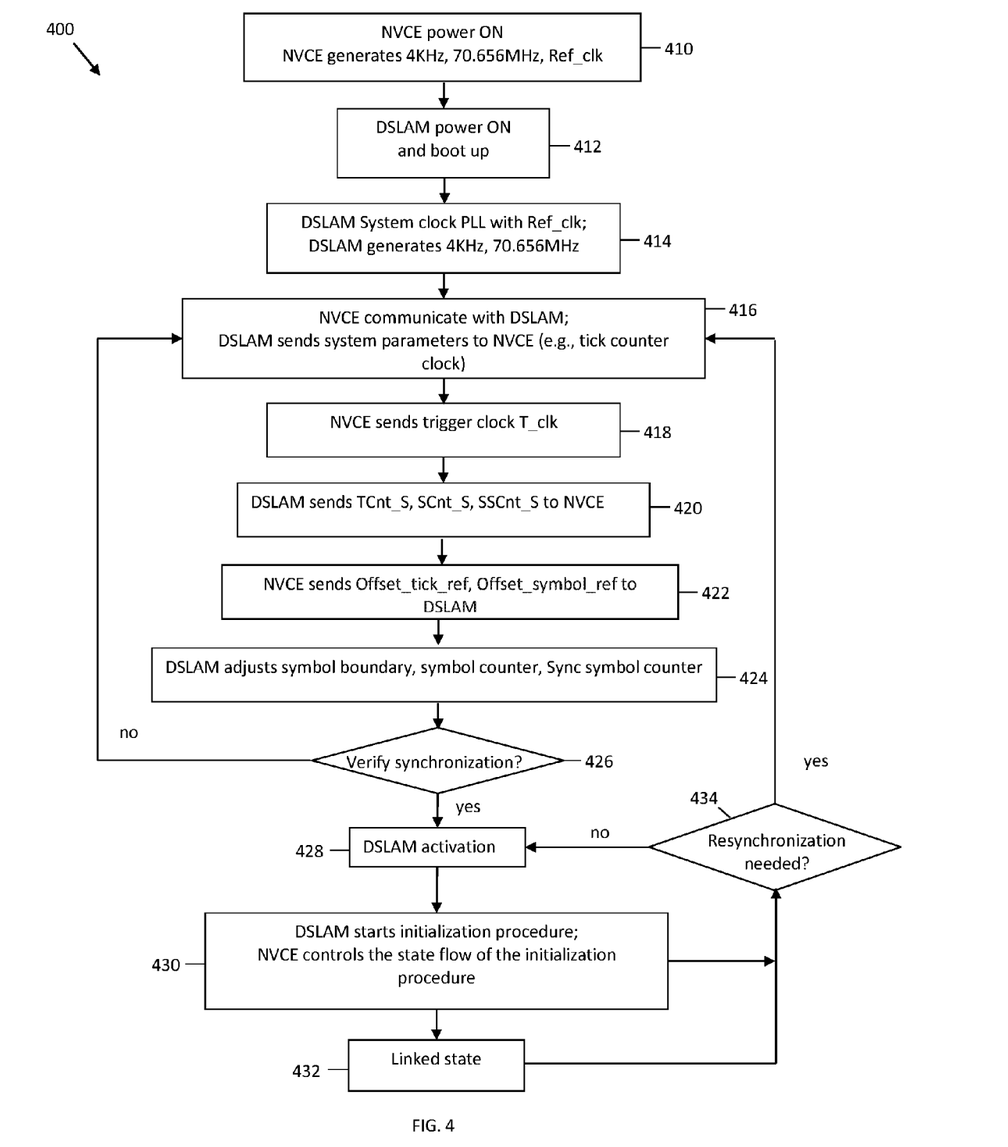
FIG. 4 illustrates an embodiment of a method for powering up a NVCE and a DSLAM.

FIG. 4 illustrates an embodiment of a method 400 for powering up a NVCE and a DSLAM. The NVCE may be powered on first in step 410, and may generate 4 kHz, 70.656 MHz, and Ref_clk clock signals. A DSLAM may be powered on and/or booted up next in step 412. In step 414, a DSLAM clock may be synchronized with Ref_clk via a PLL, and a DSLAM may generate 4 kHz and 70.656 MHz clocks. In step 416, the NVCE and DSLAM may communicate with each other to verify that they are on, and DSLAM may send system parameters, such as the clock frequency of tick counter (e.g., 70.656 MHz), to the NVCE. In step 418, the NVCE may send a pulse via a trigger clock. In step 420, the DSLAM may send parameters, such as tick counter (TCnt_S), symbol counter (SCnt_S), and Sync symbol counter (SSCnt_S) to the NVCE. In step 422, the NVCE may compute and send an offset between tick counters (Offset_tick_ref) and may compute and send an offset between DMT symbols (Offset_symbol_ref) to the DSLAM. In step 424, the DSLAM may adjust its symbol boundary, symbol counter, and Sync symbol counter based on information received from the NVCE. The DSLAM and NVCE may be synchronized after step 424.

In step 426, a determination may be made whether synchronization was successful. If not, the method repeats the synchronization process in steps 416-426. If so, the method 400 continues at step 428, in which the DSLAM may be activated. In step 430, the DSLAM may start the initialization procedure and the NVCE may control the state flow of the initialization procedure. Finally, in step 432, the DSLAM and NVCE may enter the linked state (e.g., referred to as "Showtime" in an xdsl standard) and steady data transmission may commence. At various time intervals, a check may be performed in step 434 whether resynchronization may be needed. (For example, if CPEs experience line dropping or insufficient performance, it may be beneficial for DSLAMs to resynchronize.) If so, the steps of the synchronization process 416-426 may be repeated. If not, the process continues at step 428.

Figure 5:
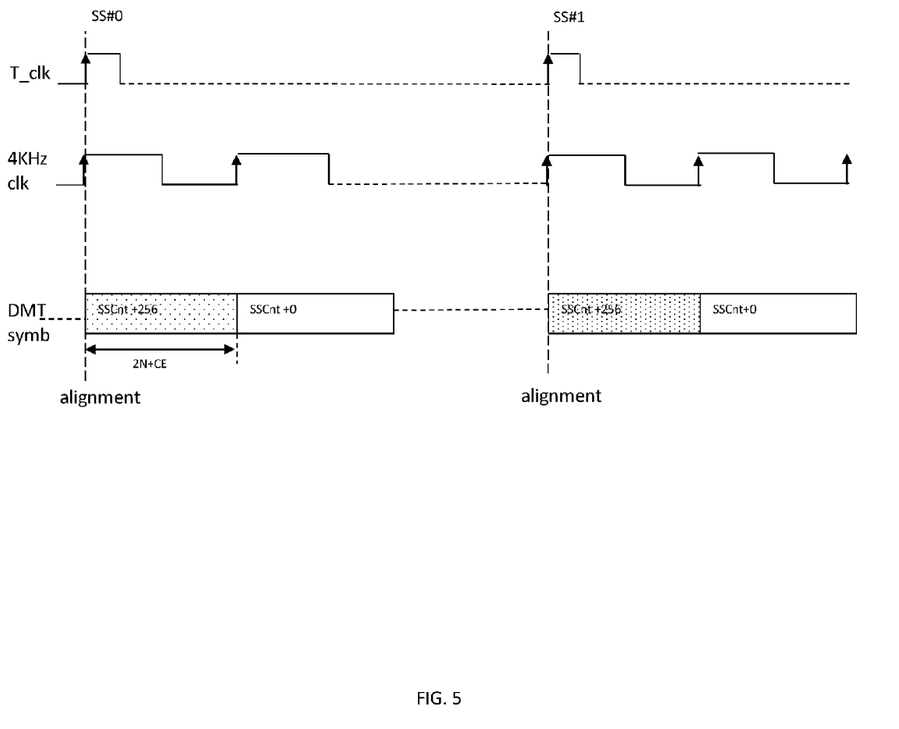
FIG. 5 illustrates a NVCE trigger clock signal.

FIG. 5 illustrates a NVCE trigger clock signal (T_clk). The trigger clock sends a pulse every Sync symbol (e.g., Sync symbols 0 and 1 are labeled as SS#0 and SS#1, and values of Sync symbol counter may be 0 and 1 corresponding to Sync symbols 0 and 1). The T_clk rising edges may be aligned with the 4 kHz clock, and the DMT symbol boundary may also be aligned with T_clk. A DSLAM may detect the rising edge of T_clk to indicate the start of DMT symbol 256. A duration of a symbol may be 2N+CE, where 2N is a size of an inverse fast Fourier transform (IFFT) used to construct a symbol and CE is a length of a cyclic extension, which may comprise a cyclic prefix and/or cyclic suffix.

Figure 6:
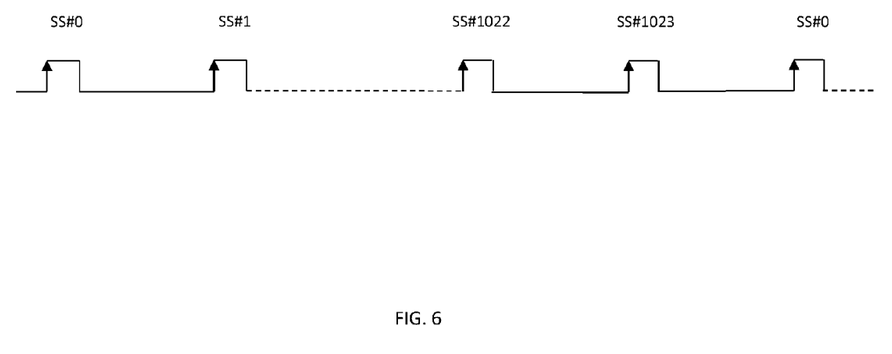
FIG. 6 is a second illustration of a NVCE trigger clock signal.

FIG. 6 is a second illustration of a NVCE trigger clock signal (T_clk). Also illustrated are corresponding Sync symbol counter values SS#0 through SS#1023. A Sync symbol counter may repeat every 1024 Sync symbols. The rising edge of T_clk may correspond to a symbol boundary, where symbol count equals 256.

Figure 7:
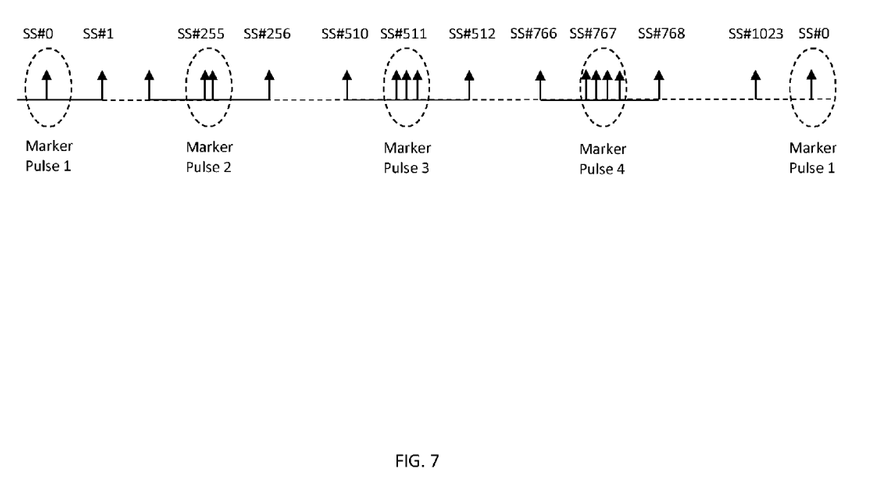
FIG. 7 illustrates trigger clock marker pulses used to mark Sync symbol counter values.

One drawback of previously discussed methods for synchronization may be that a DSLAM may not know the Sync symbol counter value. FIG. 7 illustrates trigger clock marker pulses used to mark Sync symbol counter values. Marker pulses may be used in order to synchronize Sync symbol counters between a NVCE and a DSLAM. At Sync symbol counter 0 (SS#0), the trigger clock may send a normal pulse. At Sync symbol counter 255 (SS#255), the trigger clock may send two short pulses within a normal pulse time period. At Sync symbol counter 511 (SS#511), the trigger clock may send three short pulses. Finally, at Sync symbol counter 767 (SS#767), the trigger clock may send four short pulses. At Sync symbol counter 0, the trigger clock starts over with one pulse. Marker pulses may be pulse width modulated.

An advantage of marker pulses is that DSLAMs may not be required to feed back information to an NVCE in order for the DSLAMs to become synchronized. Marker pulses may be implemented in a system with DSLAMs, such as system 200 in FIG. 2.

Figure 8:
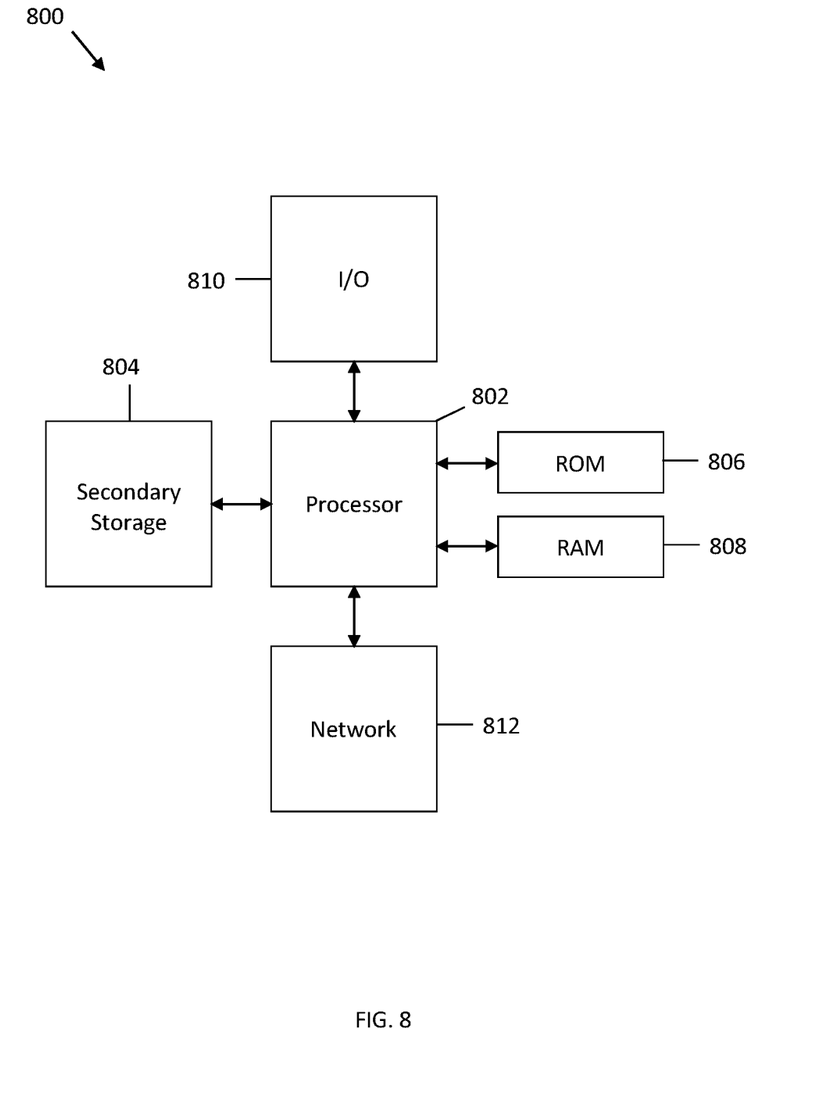
FIG. 8 illustrates a schematic diagram of an embodiment of a general-purpose network component.

Various systems and methods described above may be implemented on a general-purpose network component, such as a computer or network component with sufficient processing power, memory resources, and network throughput capability to handle the necessary workload placed upon it. FIG. 8 illustrates a schematic diagram of an embodiment of a general-purpose network component 800. Specifically, the general-purpose network component 800 may be suitable for implementing one or more embodiments of the methods or components disclosed herein, such as NTRs (e.g., NTR 210), NVCEs (e.g., NVCE 220), DSLAMs (e.g., DSLAM 230), CPEs (e.g., CPE 162), or portions thereof. The network component 800 includes a processor 802 (which may be referred to as a central processor unit or CPU) that is in communication with memory devices including secondary storage 804, read only memory (ROM) 806, random-access memory (RAM) 808, input/output (I/O) devices 810, and network connectivity devices 812. The processor 802 may be implemented as one or more CPU chips, or may be part of one or more application specific integrated circuits (ASICs). The I/O devices may, for example, comprise an interface between an NVCE (e.g., NVCE 220) and DSLAMs (e.g., DSLAM 230).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus for synchronizing a plurality of digital subscriber line access multiplexers (DSLAMs) comprising:
   a reference clock configured to generate a reference clock signal;
   an interface configured to transmit the reference clock signal to the DSLAMs, wherein each of the DSLAMs is configured to align its system clock with the reference clock;
   a trigger clock configured to generate a trigger clock pulse;
   a tick counter clock;
   at least one memory; and
   a processor configured to:
      upon a rising edge of the trigger clock pulse, save values of a tick counter, a symbol counter, and a Sync symbol counter into the at least one memory, wherein the tick counter, the symbol counter, and the Sync symbol counter are based on a count of clock cycles of the tick counter clock;
      receive values of a DSLAM tick counter, a DSLAM symbol counter, and a DSLAM Sync symbol counter from each of the at least one DSLAMs;
      for each of the DSLAMs, compute a first offset between the tick counter and the DSLAM tick counter, and compute a second offset in symbols based on the values of the symbol counter, the Sync symbol counter, the DSLAM symbol counter, and the DSLAM Sync symbol counter,
   wherein, for each of the DSLAMs, the apparatus is configured to transmit the first offset and the second offset to the corresponding DSLAM so that the corresponding DSLAM can synchronize with the apparatus.

2. The apparatus of claim 1, wherein synchronizing a DSLAM with the apparatus comprises synchronizing a DSLAM symbol boundary, symbol counter, and Sync symbol counter with an apparatus symbol boundary, symbol counter, and Sync symbol counter.

3. The apparatus of claim 2, wherein the apparatus further comprises a local clock and a phase locked loop (PLL), wherein the PLL is coupled to the reference clock, wherein the PLL is configured to receive a clock signal from a network reference clock and lock the local clock with the network reference clock.

4. The apparatus of claim 3, wherein the DSLAMs employ multitone modulation with a Sync symbol inserted every M symbols, where M is an integer, and wherein, for each of the DSLAMs, the second offset equals (symbol counter+ M*Sync symbol counter)−(DSLAM symbol counter+ M*DSLAM Sync symbol counter).

5. The apparatus of claim 4, wherein a pilot sequence counter of at least one of the DSLAMs is determined based on the Sync symbol counter.

6. The apparatus of claim 5, wherein the DSLAMs share a cable binder, and at least one of the DSLAMs is configured to mitigate crosstalk from at least one of the other DSLAMs.

7. A method for synchronizing a plurality of digital subscriber line access multiplexers (DSLAMs) comprising:
   generating a reference clock signal;
   transmitting the reference clock signal to the DSLAMs, wherein each of the DSLAMs is configured to align its system clock with the reference clock;
   transmitting a trigger clock pulse to the DSLAMs;
   upon transmitting the trigger clock pulse, saving values of a tick counter, a symbol counter, and a Sync symbol counter into at least one memory in a node vector control entity (NVCE);

receiving values of a DSLAM tick counter, a DSLAM symbol counter, and DSLAM Sync symbol counter from each of the DSLAMs;

for each of the DSLAMs, computing a first offset between the tick counter and the DSLAM tick counter, computing a second offset in symbols based on the values of the symbol counter, the Sync symbol counter, the DSLAM symbol counter, and the DSLAM Sync symbol counter, and transmitting the first offset and the second offset to a corresponding DSLAM; and transmitting the first offset and the second offset to the DSLAMs so that the DSLAMs synchronize with the NVCE.

8. The method of claim 7, wherein a DSLAM synchronizing with the NVCE comprises synchronizing a DSLAM symbol boundary, symbol counter, and Sync symbol counter with an apparatus symbol boundary, symbol counter, and Sync symbol counter.

9. The method of claim 8, wherein the NVCE further comprises a system clock, wherein the NVCE is configured to receive a clock signal from a network reference clock, and wherein the reference clock is based on locking the system clock with the network reference clock.

10. The method of claim 9, wherein the DSLAMs employ multitone modulation with a Sync symbol inserted every M symbols, where M is an integer.

11. The method of claim 10, wherein a pilot sequence counter of at least one of the DSLAMs is determined based on the Sync symbol counter.

12. The method of claim 11, wherein the DSLAMs share a cable binder, and wherein at least one of the DSLAMs is configured to mitigate crosstalk from at least one of the other DSLAMs.

13. A digital subscriber line access multiplexer (DSLAM) comprising:
    an interface that is configured to receive a trigger clock pulse from a node vector control entity (NVCE):
    at least one memory; and
    a processor configured to:
        receive the trigger clock pulse;
        upon receiving the trigger clock pulse, save values of a tick counter, a symbol counter, and a Sync symbol counter to the at least one memory;
        transmit the values of the tick counter, the symbol counter, and the Sync symbol counter to the NVCE;
        receive a value of a first offset and a second offset, wherein the first offset is based on an offset between the tick counter and an NVCE tick counter, and wherein the second offset is based on the symbol counter, the Sync symbol counter, a NVCE symbol counter, and a NVCE Sync symbol counter;
        adjust a symbol boundary, the symbol counter, and the Sync symbol counter based on the first offset and the second offset.

14. The DSLAM of claim 13, wherein the interface is further configured to receive a reference clock signal from the NVCE, the DSLAM further comprising:
    a tick counter clock;
    a system clock; and
    a phase lock loop configured to synchronize the system clock with the reference clock signal,
    wherein the tick counter, the symbol counter, and the Sync symbol counter are based on a count of clock cycles of the tick counter clock, and
    wherein the tick counter, the symbol counter, and the Sync symbol counter are referenced relative to a clock cycle boundary of the system clock.

15. The DSLAM of claim 14, wherein the DSLAM employs multitone modulation with a Sync symbol inserted every M symbols, where M is an integer, wherein the first offset equals the difference between the NVCE tick counter and the tick counter, and wherein the second offset equals (NVCE symbol counter+M*NVCE Sync symbol counter)−(symbol counter+M*Sync symbol counter).

16. The DSLAM of claim 15, wherein a pilot sequence counter of the DSLAM is determined based on the Sync symbol counter.

17. The DSLAM of claim 16, wherein the DSLAM shares a cable binder with a second DSLAM, and wherein the DSLAM is configured to mitigate crosstalk from the second DSLAM.

18. The DSLAM of claim 17, wherein the NVCE and the DSLAM are in a master-slave relationship, respectively.

* * * * *